(No Model.)
J. McCORMACK.
HARROW.
No. 564,096. Patented July 14, 1896.
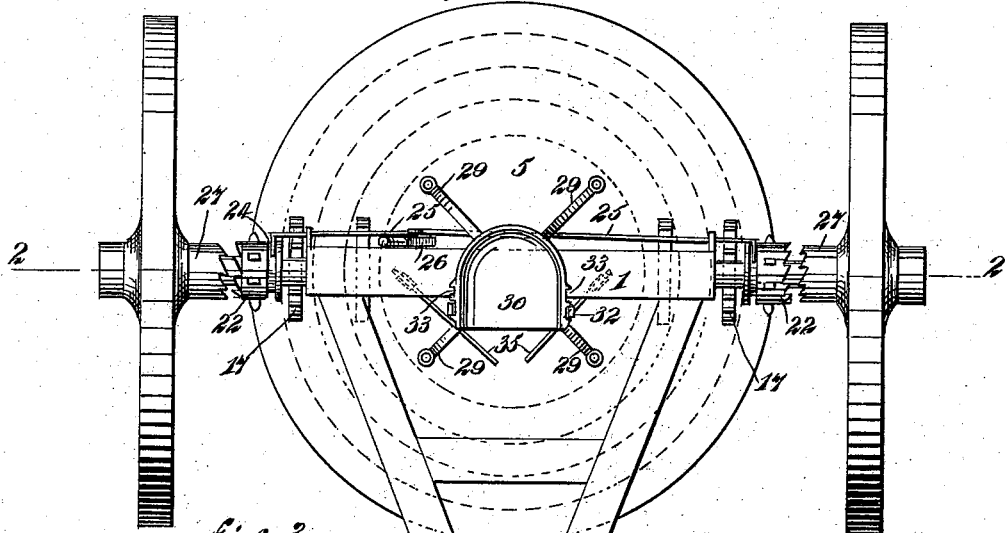
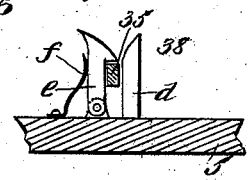
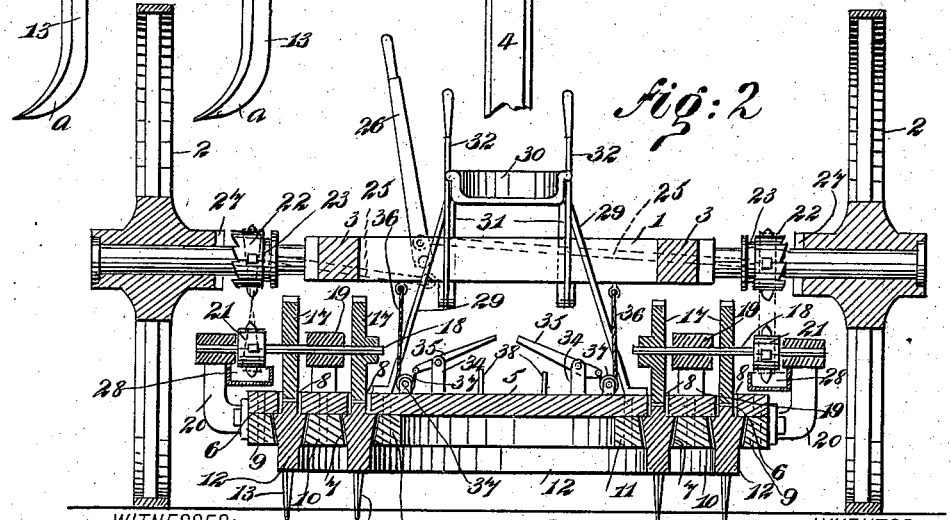
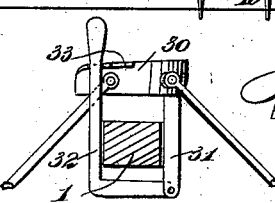
WITNESSES: INVENTOR

UNITED STATES PATENT OFFICE.

JOHN McCORMACK, OF BROOKLYN, NEW YORK.

HARROW.

SPECIFICATION forming part of Letters Patent No. 564,096, dated July 14, 1896.

Application filed August 8, 1895. Serial No. 558,665. (No model.)

*To all whom it may concern:*

Be it known that I, JOHN McCORMACK, of Brooklyn, in the county of Kings and State of New York, have invented a new and Improved Harrow, of which the following is a full, clear, and exact description.

The invention relates to an improvement in that class of harrows wherein the teeth have a circular movement; and the main object of the invention is to provide a machine which will more effectively cultivate the ground and better reduce the lumps and clogs of earth.

The invention consists in various peculiar features of construction and combinations of parts, as will be fully described hereinafter, and finally embodied in the claims.

Reference is to be had to the accompanying drawings, forming a part of this specification, in which similar characters of reference indicate corresponding parts in all the figures.

Figure 1 represents a plan view of my invention. Fig. 2 is a section thereof on the line 2 2 of Fig. 1. Fig. 3 is a detail elevation showing one of the tooth-rings and immediately-connected parts. Fig. 4 is a detail view showing a catch which will be hereinafter more fully described, and Fig. 5 is a section taken through the axle and showing in detail parts of the seat.

The axle 1 of the harrow is carried by the wheels 2 and has the hounds 3 and tongue 4 connected thereto, as usual.

Located below the axle 1 and between the wheels 2 is a disk 5, which is formed on its under side with two concentric circular grooves 6 and 7. These grooves do not communicate with the upper side of the disk 5, excepting at two points 8 in each groove, which points are directly under the axle 1 and are for a purpose which will be hereinafter described.

Bolted to the under side of the disk 5 are three concentric rings 9, 10, and 11, and these rings are formed with inclined adjacent sides so disposed as to form two dovetailed grooves, in which the correspondingly formed rings 12 are slidably arranged. The rings 12 are two in number and are projected below the rings 9, 10, and 11 and have at their lower edges the teeth 13, which are arranged at equidistant points throughout the circumferences of the rings and project downwardly therefrom to engage the ground.

The teeth 13 are approximately diamond-shaped in cross-section and are curved forwardly to form spurs $a$, which project into the ground, and because of their curved form tend to draw the rings 12 downwardly and hold them in the proper position. The teeth 13 also comprise shanks $b$, having rearwardly-projected shoulders $c$, the shanks being passed through the rings 12, while the shoulders bear against the under side thereof and serve to brace the teeth.

Formed in the rings 12 and extending transversely through from one side thereof to the other are openings 14, which are preferably four for each ring and in which the frusto-conical rollers 15 are mounted, the said rollers being adapted to bear upon the adjacent sides of the rings 9, 10, and 11, and reduce the friction between said sides and the rings 12.

Formed integral with the upper sides of the rings 12 are the cog-teeth 16, which project into the grooves 6 of the disk 5, and these cog-teeth are exposed by the openings 8 of the disk 5, so that the gear-wheels 17 may mesh with the cog-teeth. The gear-wheels 17 are four in number, two for each of the rings 12, and are arranged in two pairs, each carried by a shaft 18, having bearings in the pedestal 19 and in the brackets 20, the pedestal being projected upwardly from the disk 5, while the brackets are secured to the edges of the disk and project outwardly and upwardly therefrom.

Fixed one to each of the shafts 18 are the sprocket-wheels 21, which are geared with the clutch members 22 by means of suitable chains, and these clutch members are freely movable on the axle 1 and are provided with grooves 23 in which the thimbles 24 of the rods 25 are respectively arranged, and these rods extend inwardly and are connected to the operating-lever 26, the same being fulcrumed to the axle.

The clutch members 22 coact with companion members 27 integral with the wheels 2, the said wheels being capable of revolving freely on the axle, so that by engaging the several clutch members motion will be imparted to the several shafts 18, and thence to the rings 12 through the medium of the gears 17 and cog-teeth 16.

The brackets 20 are each provided with a pan 28, which pans are located under the sprocket-wheels 21 and are adapted to hold the chains of these wheels in place when the disk 5 and its connected parts are moved upwardly, as will be more fully described hereinafter. Projecting upwardly and inwardly from the disk 5 are the brackets 29, which are preferably four in number and which are rigid on the disk and projected above the axle and fixed to the seat 30. Rigidly secured to the seat 30 and projecting downwardly therefrom are the arms 31, which are two in number and which are slidably engaged with the rear side of the axle 1.

Fulcrumed to the extremities of the arms 31 are the respective levers 32, which are bent to embrace the axle and to project up the front side thereof. These levers have their free ends respectively engaged with the outturned sides of the seat 30, and said sides are formed with notches 33, with which the levers are respectively locked, as shown in the drawings. By these means the disk 5 is seated on the axle and allowed vertical movement independent of the same.

Rising from the disk 5 and located beneath the axle are the posts 34, which are two in number and which have the levers 35 respectively pivoted thereto. These levers are each connected to a cord 36, which is fixed to the under side of the axle and passed over pulleys 37, fixed to the disk 5. By means of the levers 35 the disk 5 and its connected parts may be raised or lowered, and the levers are held in a lowered position, which will result in the raising of the disk by means of catches 38, which are shown in detail by Fig. 4, and which comprise each a post $d$, having an inclined upper end, with which post coacts a swinging hook $e$, pressed by a spring $f$, so that it will normally engage the post $d$, and the levers 35 are held between the hook and post and may be released by pushing the catch outwardly, as will be understood.

From the above description the use and operation of my invention will be apparent, and it is only necessary for me to explain that when the parts are properly connected and the machine moving forwardly the rings 12 will move in circular paths and cause the teeth 13 to engage the ground and to cultivate the same, which cultivation will be more effective than in other machines, owing to the peculiarities of my invention. By means of the levers 35 either or both sides of the disk 5 may be raised to avoid obstructions or to throw the machine out of operative adjustment.

Having thus described my invention, I claim as new and desire to secure by Letters Patent—

1. In a harrow, the combination with a frame, of a disk carried thereby, an operated ring on the disk and movable in a circular line, teeth carried by the ring, and stationary rings secured to the disk and lying one on each side of the movable ring, substantially as described.

2. In a harrow, the combination with a frame, of a disk, rings fixed thereto and concentric with each other, a movable ring between the fixed rings, teeth carried by the movable ring, and means for operating the movable ring, substantially as described.

3. In a harrow, the combination of an axle, wheels loose thereon, clutch members on the axle and engageable with the wheels, a disk carried by the axle, a ring movable thereon, harrow-teeth connected with the ring, and gearing driven by the clutch members and imparting movement to the ring, substantially as described.

4. In a harrow, the combination with an axle, of a disk, a driven ring thereon, the ring being movable in a circular line, teeth carried by the ring, a lever fulcrumed on the disk, and a connection between the lever and the axle, substantially as described.

5. In a harrow, the combination with a frame, of harrow-teeth vertically movable, means for supporting said harrow-teeth, the means being suspended from the frame, brackets rising from the tooth-supporting means and extended above the frame, and a seat carried by the brackets, substantially as described.

6. In a harrow, the combination with an axle, of harrow-teeth, vertically-movable means for supporting the teeth, said means being suspended from the axle, brackets rigidly carried on the tooth-supporting means and rising above the axle, a seat carried on the brackets, an arm fixed to the seat and extending downwardly alongside of the axle, and a bent lever fulcrumed to the lower portion of the arm, the lever embracing the axle and being capable of removable connection with the seat, substantially as described.

7. In a harrow, the combination with a frame, of a disk below the same, two concentric rings each movable in a circular line and carried by the disk, harrow-teeth fixed to the rings, cog-teeth carried by the rings, gear-wheels meshing with the cog-teeth, and movement-transmitting devices for driving the gear-wheel, substantially as described.

8. In a harrow, the combination of a disk having an opening therein, a ring revolubly held below the disk, a cog-rim carried by the ring and exposed by the opening of the disk, driven gearing projecting through the opening and engaging with the cog-rim, and teeth carried by the ring, substantially as described.

9. In a harrow, the combination of a disk having an opening therein, a tooth-frame below the disk, a cog-rim on the tooth-frame and exposed by the opening in the disk, and driven gearing projected through the opening and meshing with the cog-rim, substantially as described.

10. In a harrow, the combination of a disk having a series of openings therein, a plurality of rings fixed to the under side of the disk, two rings movable in the spaces between the fixed rings, cog-rims respectively carried by the movable rings, harrow-teeth carried by the movable rings, a driven shaft mounted horizontally above the disk, and spur-gears carried by said shaft and respectively projected through the openings in the disk and engaging with the cog-rims on the moving rings, substantially as described.

JOHN McCORMACK.

Witnesses:
 ISAAC B. OWENS,
 C. SEDGWICK.